United States Patent
Briend et al.

(10) Patent No.: US 6,346,284 B1
(45) Date of Patent: Feb. 12, 2002

(54) FOOD OR NUTRITIONAL SUPPLEMENT, PREPARATION METHOD AND USES

(75) Inventors: André Briend, Paris; Michel Lescanne, Malaunay, both of (FR)

(73) Assignee: Nutriset (FR)

( * ) Notice: Subject to any disclaimer, the term of this patent is extended or adjusted under 35 U.S.C. 154(b) by 0 days.

(21) Appl. No.: 09/554,847

(22) PCT Filed: Nov. 19, 1998

(86) PCT No.: PCT/FR98/02469

§ 371 Date: Jul. 14, 2000

§ 102(e) Date: Jul. 14, 2000

(87) PCT Pub. No.: WO99/26490

PCT Pub. Date: Jun. 3, 1999

(30) Foreign Application Priority Data

Nov. 21, 1997 (FR) ............................................ 97 14655

(51) Int. Cl.$^7$ ................................................. A23L 1/29
(52) U.S. Cl. ............................ 426/93; 426/93; 426/94; 426/549; 426/550; 426/633; 426/588; 426/2; 426/810; 424/439
(58) Field of Search ........................... 426/93, 99, 633, 426/588, 549, 550, 2, 800, 801, 94, 810; 424/439

(56) References Cited

U.S. PATENT DOCUMENTS

| | | | | | |
|---|---|---|---|---|---|
| 1,631,858 A | * | 6/1927 | Gelfand | ...................... | 426/633 |
| 2,911,300 A | * | 11/1959 | Peebles | ...................... | 426/99 |
| 3,617,302 A | * | 11/1971 | Collins | ...................... | 99/56 |
| 3,773,519 A | * | 11/1973 | Pisecky | ...................... | 426/99 |
| 3,810,765 A | * | 5/1974 | Nagasawa | ...................... | 426/588 |
| 3,896,240 A | * | 7/1975 | Gruette | ...................... | 426/271 |
| 3,992,555 A | * | 11/1976 | Kovacs | ...................... | 426/72 |
| 3,992,556 A | * | 11/1976 | Kovacs | ...................... | 426/99 |
| 4,104,406 A | * | 8/1978 | Stringer | ...................... | 426/99 |
| 4,906,616 A | * | 3/1990 | Gilchrist | ...................... | 515/8 |
| 5,032,411 A | * | 7/1991 | Stray-Gundersen | ...................... | 426/74 |
| 5,093,143 A | | 3/1992 | Behr et al. | | |
| 5,114,723 A | * | 5/1992 | Stray-Gundersen | ...................... | 426/74 |
| 5,229,147 A | * | 7/1993 | Kubota | ...................... | 426/2 |
| 5,240,734 A | * | 8/1993 | Izzo | ...................... | 426/633 |
| 5,391,383 A | * | 2/1995 | Sullivan | ...................... | 426/99 |
| 5,405,637 A | * | 4/1995 | Martinez | ...................... | 426/580 |
| 5,433,970 A | * | 7/1995 | Wong | ...................... | 426/633 |
| 5,438,043 A | * | 8/1995 | Ljungqvist | ...................... | 514/23 |
| 5,447,730 A | * | 9/1995 | Greenleaf | ...................... | 424/680 |
| 5,455,235 A | * | 10/1995 | Takaichi et al. | ...................... | 514/54 |
| 5,490,999 A | * | 2/1996 | Villagran | ...................... | 426/633 |
| 5,518,755 A | * | 5/1996 | Wong | ...................... | 426/633 |
| 5,549,917 A | * | 8/1996 | Cherukuri | ...................... | 426/96 |
| 5,552,167 A | * | 9/1996 | Taylor | ...................... | 426/99 |
| 5,660,865 A | * | 8/1997 | Pedersen | ...................... | 426/99 |
| 5,661,123 A | * | 8/1997 | Stalker | ...................... | 514/2 |
| 5,676,966 A | * | 10/1997 | Kitamura | ...................... | 426/99 |
| 5,695,803 A | * | 12/1997 | Sharp | ...................... | 426/549 |
| 5,698,248 A | * | 12/1997 | Lonergan | ...................... | 426/99 |
| 5,993,873 A | * | 11/1999 | Kuslys | ...................... | 426/285 |
| 6,048,557 A | * | 4/2000 | Van Den Burg | ...................... | 426/99 |
| 6,099,871 A | * | 8/2000 | Martinez | ...................... | 426/2 |
| 6,139,887 A | * | 10/2000 | Carment | ...................... | 426/99 |
| 6,194,379 B1 | * | 2/2001 | McEwen | ...................... | 426/72 |
| 6,258,387 B1 | * | 7/2001 | McEwen | ...................... | 424/757 |

FOREIGN PATENT DOCUMENTS

| | | | |
|---|---|---|---|
| DE | 2 345045 | | 7/1975 |
| EP | 0442140 | | 12/1990 |
| GB | 2 242 342 | | 10/1991 |
| WO | WO91/12734 | * | 9/1991 |
| WO | WO94/14458 | | 7/1994 |
| WO | WO97/05789 | | 2/1997 |
| WO | WO99/26490 | | 3/1999 |

OTHER PUBLICATIONS

Harper, H. A. 1971. Review of Physiological Chemistry, 13$^{th}$ edition. Lange Medical Publicatios, Los Altos, CA. p. 495–498.*

Abstract in English of DE 23 45 045.

Abstract of "Treatment of severe malnutrition with a therapeutic spread", 1997, A. Briend.

* cited by examiner

*Primary Examiner*—Carolyn Paden
(74) *Attorney, Agent, or Firm*—Piper Marbury Rudnick & Wolfe

(57) ABSTRACT

The invention concerns a complete food or nutritional supplement containing at most 10% of water by weight, preferably at most 5% of water, and more preferably at most 2% of water, with low osmolality, oxidation-stable, comprising a mixture of quality food products, said mixture being coated by at least a substance rich in lipids derived optionally from oleaginous seeds.

23 Claims, No Drawings

FOOD OR NUTRITIONAL SUPPLEMENT, PREPARATION METHOD AND USES

The invention relates to energy-rich foods of low osmolality containing at most 10% of their weight of water. This invention makes it possible to prepare foods supplying all the nutriments and, in particular, the minerals and all the vitamins necessary for the renourishment of undernourished patients, and can therefore be used as a complete food for these patients. This invention also makes it possible to prepare nutritional supplements for supplying all the nutriments which are present in insufficient amount in diets where cereals make up the essential part of the food intake. These foods are insoluble in water before dispersion by agitation, and do not generate hyperosmolality. They are stable to oxidation. The invention further relates to the process for the preparation of these foods and to their uses.

Severely undernourished patients are usually renourished with powdered foods which are dissolved in water before consumption. These foods are prepared from powdered milk products skimmed milk, whey) mixed with carbohydrates, vitamins, minerals and lipids. To boost the energy value of these products, the lipids generally represent more than 30% of the dry weight of these foods. The products most commonly used at the present time, called formulae F75 and F100, have been described by A. BRIEND AND M. H. N. GOLDEN in "Malnutrition sévère de l'enfant" ("Severe malnutrition in children"), Encyclopédie Médico Chirurgicale (Elsevier, Paris), Endocrinologie Nutrition (Endocrinology Nutrition), 10-337-A-10, 1997, page 8. Their name is a reminder that, after dilution, they provide 75 and 100 kcal/100 ml, respectively. However, these powdered products have a number of disadvantages. First of all, there are risks of dosage errors because they are prepared by dilution in water, these risks being eliminated by using preprepared products. Furthermore, dilution in water before consumption can be a factor in bacterial contamination, making the use of these powdered products risky when the hygiene conditions are poor. Moreover, this dissolution in water before consumption results in the preparation of meals which are frequently hyperosmolar when one attempts to increase their energy value. With the conventional powdered renourishment foods, it is difficult to achieve an energy density of very much more than 100 kcal/100 ml after dilution, because of the increase in osmolality, which can rise beyond 400 mOsm/kg. This constitutes a major problem because undernourished subjects do not tolerate foods with an osmolality greater than that of blood plasma (about 290 mOsm/kg), which are likely to cause diarrhea in such subjects. This dilution in water further imposes the use of soluble mineral salts in order to enrich foods of this type, insoluble salts being likely to remain at the bottom of the vessel if not all the diluted food is ingested. These soluble salts have a pronounced taste whereas insoluble salts are insipid. Foods intended for dilution in water therefore have a rather unpleasant taste if they are enriched in minerals. Furthermore, presentation of these foods in powder form increases their contact area with the ambient atmosphere penetrating the powder. This phenomenon exposes these foods to the risk of oxidation during storage, all the more so if they are in the form of a fine powder. This oxidation can affect the lipids, causing the food to turn rancid, and also any oxidation-sensitive vitamins that may be present, particularly vitamin C and vitamin A. If the use-by date of these products is to be more than a few weeks in a tropical climate, it is necessary to coat the lipid part of these products with a protective layer of proteins or carbohydrates and package these products under a chemically inert gas, such as carbon dioxide or nitrogen, in perfectly airtight bags. This constraint considerably increases the price of these renourishment products and limits the possibilities of manufacturing these products in developing countries. Furthermore, these various powdered products are bulky to store and create numerous transportation and handling problems.

Sweetened condensed milk products have the property of a very low water content, so they are resistant to bacterial contamination. However, these milk products cannot be used without prior dilution by undernourished subjects because of their extremely high osmolality. They still have a high osmolality even after dilution. Furthermore, their relative proportions of proteins, lipids and carbohydrates are very different from those of conventional milk products and also very different from formulae of the F100 or F75 type. Undernourished subjects are therefore strongly advised against these products.

It has also been proposed to renourish undernourished subjects with suitable biscuits, which are naturally resistant to bacterial contamination on account of their low water content. However, biscuits cannot easily supply more than 10 to 12% of their weight of lipids for reasons of mechanical strength and storage. In addition, heat-sensitive vitamins are destroyed in the preparation of biscuits, which have to be baked at high temperature.

There is therefore a genuine need for complete foods and nutritional supplements which have a pleasant taste, are stable to oxidation, can be consumed directly without prior dilution in water, are easy to transport, have a high energy value, can contain oxidation-sensitive products such as vitamins, certain mineral salts and certain enzymes, and have a low osmotic strength so as to avoid diarrhea-type side effects in undernourished subjects.

The inventors have developed complete foods and nutritional supplements which possess all these properties.

The present invention therefore relates to a complete food or nutritional supplement which is rich in lipids, contains at most 10%, preferably at most 5% and particularly preferably at most 2% of its weight of water, has a low osmolality and is stable to oxidation, comprising a mixture of food-grade products, said mixture being coated with at least one lipid-rich substance optionally derived partly from oleaginous seeds.

"Lipid-rich food" is understood hereafter as meaning a complete food or nutritional supplement which contains at least 30% of its total weight of lipids.

The products which provide the major part of the proteins, carbohydrates, vitamins and minerals contained in the final product are in the form of a fine powder or in the form of particles or granules. These products are mixed together in a first stage. Some products can be in liquid form, but in this case they are present in proportions such that, after mixing, the whole is pulverulent or in the form of particles or granules and such that the water content of the resulting complete food or nutritional supplement is at most 10% by weight, preferably at most 5% by weight and particularly preferably at most 2% by weight.

This first mixture in powder form is then incorporated into a lipid-rich pasty substance which can optionally be derived partly from oleaginous seeds. The final product, namely the complete food or nutritional supplement according to the invention, has a semi-pasty or pasty consistency. The final product is not soluble in water, being a mixture consisting of a pulverulent, granular or particulate phase which is anhydrous or has a very low water content, contained in a viscous lipid phase. This mixture does not therefore develop an appreciable osmotic pressure. The osmolality remains below 100 mOsm/kg when the product is immersed in four times its own weight of water. This property persists for as long as the product is not suspended by agitation.

The consistency of the final product can be chosen according to its use by modifying the fatty acid composition of the lipid phase. The viscosity at 25° C. of this complete food or nutritional supplement can be between 200 and 100, preferably between 180 and 120 and particularly preferably between 160 and 150 poises. This consistency enables the product to be consumed by young children, as a general rule from the age of twelve months. It can also be swallowed easily by undernourished patients with very weak muscles.

Preferably, the viscosity of the complete food or nutritional supplement according to the invention is sufficiently low for it to be pourable if it is contained in a flexible pack on which a slight pressure is exerted, while at the same time being sufficiently high for it not to spill out spontaneously under its own weight.

The mixture in the form of powder, particles or granules is coated with at least one lipid-rich substance which may be derived partly from oleaginous seeds. The oleaginous seeds employed can be peanuts, cocoa beans, almonds, coconuts or pistachio nuts, or they can consist of a mixture of various fats of vegetable origin. These seeds are preferably ground to a paste without subsequent purification. Peanuts can optionally be used, in which case they are ground to give a paste containing small proportions of unground particles.

The complete food or nutritional supplement according to the invention contains at least one product which provides proteins, particularly skimmed milk, powdered yoghurt or whey, and/or at least one product which provides carbohydrates, particularly carbohydrate bulking agents, sucrose, glucose, fructose, skimmed milk, whey, or flour made of maize, wheat, millet, oats, rice, cassava or potato starch, and/or at least one product which provides lipids.

"Carbohydrate bulking agents" are understood as meaning hydrolyzates of starch or starch derivatives which are assimilable by the organism, for example maltodextrin.

The lipid coating substance, if derived from oleaginous seeds, also contributes towards the provision of proteins, as well as lipids of course, in said complete food or nutritional supplement. The coating substance can provide between 10% and 40% of the proteins in the food, thereby substantially reducing the cost of the final product compared with the equivalent powdered products containing only proteins derived from milk.

Vegetable or animal fats can be used as products which provide lipids. Fats of vegetable origin are generally preferred because they are more digestible. The choice of fat used depends on the desired nutritional value and the desired viscosity.

By virtue of its variable viscosity, the complete food or nutritional supplement can take up the shape of an airtight pack so as to minimize the amounts of residual air present in the pack. In this case, the contact area of the lipid component of this product with the ambient atmosphere is very greatly reduced by comparison with the equivalent powdered products. The level of protection against oxidation which is achieved in this case enables this product to be stored for several months or several years without packaging it under an inert gas.

The complete food or nutritional supplement according to the invention can be artificially enriched in vitamins, soluble or insoluble mineral salts or mixtures thereof. It can include enzymes. These vitamins, enzymes or mineral salts are sometimes unstable substances. The composition of the complete food or nutritional supplement ensures that these substances are preserved under optimal conditions since they are coated with a lipid-rich substance, said substance forming a barrier to oxygen and moisture and between the different constituents which may react with one another.

As the product is not in aqueous solution, it is of no consequence whether the mineral salts used are soluble or insoluble in water. Insoluble mineral salts have the advantage of being less expensive and insipid. Examples of mineral salts which may be mentioned are calcium carbonate, zinc oxide, copper sulfate, potassium chloride, magnesium oxide and iron salts.

Food-grade additives, especially agents for facilitating the mixing of powders, emulsifiers, sweeteners, colors or aromas, can also be incorporated into said mixture in order to make the product more appetizing and hence easier to consume.

The level of protection against oxidation which is afforded by the lipid phase makes it possible to consider including digestive enzymes or products rich in digestive enzymes, for example powdered yoghurt. These products can facilitate digestion for some undernourished subjects.

The absence of air inside a pack containing this food or this nutritional supplement increases its density. It can be acknowledged that 1 tonne of this complete food or nutritional supplement occupies a volume of about 1 $m^3$, whereas an equivalent powdered product would occupy a volume of 2 $m^3$. This high density greatly facilitates the transportation of this complete food or these nutritional supplements compared with the equivalent powdered products.

The complete food or nutritional supplement according to the invention comprises a mixture of at least one product which provides carbohydrates, and/or at least one product which provides proteins, and/or at least one product which provides lipids, coated with the lipid-rich substance, in proportions such that the energy supplied per 100 g of complete food or nutritional supplement is greater than 350 kcal and particularly preferably greater than 450 kcal.

Thus the energy value of the complete food or nutritional supplement is very much greater than that of the products conventionally used in renourishment diets obtained by diluting a powdered product in water, the dissolution of said powdered product in water imposing a limit in terms of energy content because of the problems of hyperosmolality.

In one particular embodiment of the invention, the complete food or nutritional supplement according to the invention comprises a mixture of:

5 to 50%, preferably 10 to 30% and particularly preferably 15 to 25% of vegetable fats;

2 to 60%, preferably 5 to 40% and particularly preferably 10 to 20% of skimmed milk;

2 to 60%, preferably 5 to 40% and particularly preferably 10 to 20% of whey;

5 to 50%, preferably 10 to 30% and particularly preferably 15 to 25% of carbohydrate bulking agent;

0 to 15%, preferably 2 to 10% and particularly preferably 6 to 8% of sucrose; and 0 to 10%, preferably 0 to 6% and particularly preferably 0 to 3% of emulsifier, said mixture being coated with 10 to 90%, preferably 15 to 50% by weight and particularly preferably 20 to 30% by weight of peanut paste, said percentages being expressed by weight based on the total weight of the complete food or nutritional supplement.

Of course, the various percentages will be adapted according to the type of diet to be followed, especially if it is a renourishment diet in the initial phase or in the rapid growth phase. In particular, it is possible to reduce the amount of proteins and lipids present in the final mixture in order to prepare a food for use during the first phase of the treatment.

The complete food or nutritional supplement according to the invention can be prepared by a process wherein all or part of the products in the form of powder, particles or granules is mixed, the fats and the coating substance are then added to this mixture, the ingredients are mixed again and the resulting composition is then poured into the pack.

Preferably, in this manufacturing process, the products in the form of powder, particles or granules which are in low concentration are mixed first, the products in the form of powder, particles or granules which are in higher concentration are then added, with simultaneous mixing, and finally the fats and the coating substance are incorporated.

Preferably, to facilitate adherence to the diet, packs are used which contain the amount of complete food or nutritional supplement consumed in one meal or a sufficient amount to satisfy the daily nutritional requirements of the person to whom this product is to be administered.

The complete food or nutritional supplement can be consumed directly in the form of a paste, without prior dilution in water. It can be used in nutritional programs intended especially for young children, as a general rule from the age of twelve months, the elderly or adolescents. Use in younger children can be envisaged in cases where it is possible to ensure that the child consumes water in amounts sufficient to cover his requirements, at mealtimes or between meals. The doses are calculated according to the requirements of the person following this diet. The complete food or nutritional supplement can also be used in a mixture with conventional culinary preparations.

In view of the absence of dilution, problems of bacterial proliferation, especially following bacterial contamination by the water or the vessels in which the dilutions are performed, are eliminated.

The present invention is now illustrated with the aid of the non-limiting Examples below.

EXAMPLES

Example 1

Complete food for renourishing undernourished subjects

The following are poured into a kneading machine:

one 25 kg bag of skimmed milk powder, one 25 kg bag of whey, one 25 kg bag of maltodextrin, then 12.5 kg of sucrose and 1 kg of mineral and vitamin complement whose composition is given in Table 1 below.

The kneading hook is then switched on for 3 minutes at 55 rpm, followed by 3 minutes in the opposite direction and finally by 2 minutes at 85 rpm.

40 kg of peanut paste and 40 kg of fat, whose composition is described in Table 2, are then poured into the kneader. The ingredients are agitated for 4 minutes at 55 rpm and then for 2 minutes at 85 rpm.

The nutritional composition of this complete food is given in Table 3. This formula has an energy value of 545 kcal/100 g, which is more than 5 times that of formula F100 after dilution.

The viscosity of the resulting paste as a function of temperature is indicated in FIG. 1.

TABLE I

Mixture of vitamins and minerals used in Example 1

| Product | Amount (in grams per 600 grams, i.e. per 100 kg of food) |
|---|---|
| Vitamin A | 8.68 |
| Vitamin D | 5.04 |
| Vitamin E | 31.50 |
| Vitamin C | 45.53 |
| Vitamin B1 | 0.47 |
| Vitamin B2 | 1.42 |
| Vitamin B6 | 0.47 |
| Vitamin B12 | 0.42 |
| Vitamin B9 | 0.17 |
| Vitamin PP | 4.17 |
| Vitamin B5 | 2.44 |
| Vitamin B8 | 0.05 |
| Vitamin K | 0.33 |
| Zinc oxide | 9.30 |
| Calcium carbonate | 93.06 |
| Copper sulfate | 3.24 |
| Potassium chloride | 393.71 |
| TOTAL | 600 |

TABLE 2

Composition given by way of indication of the fat employed in Example 1 for the manufacture of a complete food

| Fatty acid | Percentage | Fatty acid | Percentage |
|---|---|---|---|
| C6 | 0.10 | C18:0 | 8.80 |
| C8 | 1.25 | C18:1 | 31.65 |
| C10 | 1.10 | C18:2 | 8.3 |
| C12 | 14.35 | C18:3 | 0.20 |
| C14 | 5.50 | C20:0 | 0.30 |
| C16 | 27.80 | C20:1 | 0.1 |
|  |  | various | 0.55 |

TABLE 3

Nutritional composition given by way of indication of the complete food described in Example 1

|  | Amount per 100 g | Percentage of energy |
|---|---|---|
| Energy | 545 kcal |  |
| Proteins | 14 g | 10 |
| Carbohydrates | 43 g | 31 |
| Lipids | 36 g | 59 |

Example 2

Nutritional supplement in the form of a fatty sauce based on peanut paste

A mixture containing the following is prepared:

33 kg of peanut paste, 26 kg of fat, 37 kg of debittered whole soya flour, 4 kg of the mineral and vitamin complement whose composition is given in Table 4.

TABLE 4

| Product | Amount (in grams per 4000 grams, i.e. per 100 kg of gruel) |
| --- | --- |
| Vitamin A | 6.12 |
| Vitamin D | 2.80 |
| Vitamin E | 13.68 |
| Vitamin C | 59.74 |
| Vitamin B1 | 1.20 |
| Vitamin B2 | 1.50 |
| Vitamin B6 | 0.67 |
| Vitamin B12 | 1.61 |
| Vitamin B9 | 0.31 |
| Vitamin PP | 9.29 |
| Vitamin B5 | 7.14 |
| Zinc oxide | 12.63 |
| Iron sulfate | 10.26 |
| Calcium carbonate | 1244.54 |
| Copper sulfate | 1.18 |
| Potassium chloride | 1205.45 |
| Magnesium oxide | 185.18 |
| Dipotassium phosphate | 1185.31 |
| Tricalcium phosphate | 51.31 |
| TOTAL | 4000 |

The fatty product obtained can be used as a fatty sauce useful for supplementing a gruel for family preparation. The gruel then obtained has the following composition:

14.4 g of wheat flour, 3.4 g of sucrose, 77.8 g of water, 4.4 g of sauce.

The gruel obtained represents a complete food providing all the vitamins and all the minerals needed to renourish a moderately undernourished child.

The resulting fatty product can also be consumed on its own, as a complement to a cereal-based diet, without first being mixed with a gruel. In fact, its consistency is sufficiently fluid to enable it to be consumed directly by children of more than six months, preferably of more than twelve months. Its low osmolarity means that it can be tolerated perfectly by young children, despite its high mineral salt content. Furthermore, a taste which is perfectly acceptable to children can be obtained by the use of insoluble mineral salts, which is possible with this type of food.

Example 3

Nutritional supplement in the form of a fatty sauce not containing peanuts

A mixture containing the following is prepared:

20 kg of defatted soya flour (or any other protein source except for ingredients derived from peanuts), 52 kg of fat, 13 kg of whey, 7 kg of sucrose, 8 kg of mineral and vitamin complement whose composition is given in Table 1.

This product is used under the same conditions as the product described in Example 2. It has the additional advantage that it can be used in areas where allergy to peanut paste is common.

Example 4

Nutritional supplement in the form of a fatty sauce with milk proteins as the only protein source A mixture containing the following is prepared:

40 kg of fat, 40 kg of skimmed milk powder, 16 kg of whey, 4 kg of sucrose, 0.23 kg of mineral and vitamin complement whose composition is given in Table 1.

This product is used under the same conditions as the product described in Examples 2 and 3. Its composition can be adjusted so that, after mixing with a cereal flour, it complies with the specifications of the Codex Alimentarius in respect of foods for young children, the concentrations of proteins, lipids and carbohydrates and also the concentrations of vitamins and minerals. It therefore has the advantage that it can optionally be given, mixed with a cereal flour, to young children from the age of four months. The addition of amylase enables it to be used, after mixing with a cereal flour, for children whose pancreatic function is insufficiently mature to allow the digestion of large amounts of starch.

What is claimed is:

1. Complete food or nutritional supplement which contains at most 10% by weight of water, develops an osmolality of less than 100 mOsm/kg after immersion in four times its own volume of water and is stable to oxidation, comprising a mixture of food-grade products, said mixture being coated with at least one lipid-rich substance derived from oleaginous seeds and being enriched in vitamins, soluble or insoluble mineral salts, enzymes or mixtures thereof.

2. Complete food or nutritional complement according to claim 1, containing at least 30% of its total weight of lipids.

3. Complete food or nutritional supplement according to claim 1 in the form of a viscous or semi-viscous water-insoluble paste which develops an osmolality of less than 50 mOsm/kg, after immersion in four times its own volume of water.

4. Complete food or nutritional supplement according to claim 3 which develops as osmolality of less than 10 mOsm/kg after immersion in four times its own volume of water.

5. Complete food or nutritional supplement according to claim 1, presenting a viscosity at 25° C. of between 200 and 100.

6. Complete food or nutritional supplement according to claim 5 which presents a viscosity at 25° C. of between 180 and 120 g/cm.s.

7. Complete food or nutritional supplement according to claim 6 which presents a viscosity at 25° C. of between 160 and 150 g/cm.s.

8. Complete food or nutritional supplement according to claim 1, wherein the coating substance contains a paste derived from one or more oleaginous seeds, selected from the group conmprising peanuts, cocoa beans, almonds, walnuts, hazelnuts, coconuts and pistachio nuts.

9. Complete food or nutritional supplement according to claim 8 wherin the coating substance contains a paste derived from one or more oleaginous seeds, in a proportion greater than 40% of the weight of the lipid coating substance.

10. Complete food or nutritional supplement according to claim 1, wherein the mixture of food-grade products coated with the lipid phase is in the form of powder, granules or particles and contains:

at least one powdered product which provides proteins, particularly skimmed milk, powdered yoghurt or whey;

or at least one product which provides carbohydrates, particularly sucrose, glucose, fructose, maltodextrin, skimmed milk, whey, or flour made of maize, wheat, millet, oats, rice, cassava or potato starch;

or at least one product which provides lipids, selected from the group comprising vegetable and animal fats.

11. Complete food or nutritional supplement according to claim 10 further containing food-grade additives selected in the group comprising mixing aids, emulsifiers, sweeteners, colors or aromas.

12. Complete food or nutritional supplement according to claim 1, comprising a mixture of at least one product which provides carbohydrates, or at least one product which provides proteins, or at least one product which provides lipids, coated with a lipid-rich substance derived from oleaginous seeds, so that the energy value per 100 g of complete food or nutritional supplement is greater than 350 kcal.

13. Complete food or nutritional supplement according to claim 12 in which the energy value per 100 g of complete food or nutritional supplement is greater than 450 kcal.

14. Complete food or nutritional supplement according to claim 1, comprising a mixture of:

5 to 50% of vegetable fats;

2 to 60% of skimmed milk;

2 to 60% of whey;

5 to 50% of carbohydrate bulking agent;

0 to 15% of sucrose; and 0 to 10% of emulsifier, said mixture being coated with 10 to 90% by weight of lipid-rich oleaginous paste said percentages being expressed by weight based on the total weight of said complete food or nutritional supplement.

15. Complete food or nutritional supplement according to claim 14 comprising a mixture of:

10 to 30% of vegetable fats;

5 to 40% of skimmed milk;

5 to 40% of whey;

10 to 30% of carbohydrate bulking agent;

2 to 10% of sucrose; and 0 to 6% of emulsifier, said mixture being coated with 15 to 50% by weight of lipid-rich oleaginous paste.

16. Complete food or nutritional supplement according to claim 15 comprising a mixture of:

15 to 25% of vegetable fats;

10 to 20% of skimmed milk;

10 to 20% of whey;

12 to 25% of carbohydrate bulking agent;

6 to 8% of sucrose; and 0 to 3% of emulsifier, said mixture being coated with 20 to 30% by weight of lipid-rich oleaginous paste.

17. Complete food or nutritional supplement according to claim 15 wherein the lipid-rich oleaginous paste is peanut paste.

18. Complete food or nutritional supplement according to claim 16 wherein the lipid-rich oleaginous paste is peanut paste.

19. Complete food or nutritional supplement according to claim 14 wherein the lipid-rich oleaginous paste is peanut paste.

20. Process for the preparation of a complete food or food complement according to claim 1, wherein all or part of the products which provide carbohydrates, the products which provide proteins, and the vitamins, minerals, enzymes and additives is mixed, the products which provide lipids and the coating substance are then added to this mixture, the ingredients are mixed again and the resulting product is then poured into the pack.

21. Method for the renourishment or nutritional supplementation or for correcting deficiencies of vitamins or mineral salts in which the complete food or nutritional supplement according to claim 1 is given as main food or is added to the meals in nutritional programs.

22. Complete food or nutritional supplement according to claim 1, which contains at most 5% of water.

23. Complete food or nutritional supplement according to claim 22 which contains at most 2% of water.

* * * * *

UNITED STATES PATENT AND TRADEMARK OFFICE
CERTIFICATE OF CORRECTION

PATENT NO. : 6,346,284 B1  Page 1 of 1
APPLICATION NO. : 09/554847
DATED : February 12, 2002
INVENTOR(S) : Andre Briend et al.

It is certified that error appears in the above-identified patent and that said Letters Patent is hereby corrected as shown below:

Page 1 (e.g., title page), left column, under item (73):

Replace "Assignee: Nutriset (FR)" with

--Assignee: Nutriset (FR) and Institut de Recherche pour le Developpement (IRD) (FR)--

Signed and Sealed this

Fifth Day of May, 2009

JOHN DOLL
*Acting Director of the United States Patent and Trademark Office*